Aug. 10, 1937.   W. M. UPDEGRAVE   2,089,863
APPARATUS FOR TESTING AND EXERCISING THE EYES
Filed April 17, 1935    3 Sheets-Sheet 1
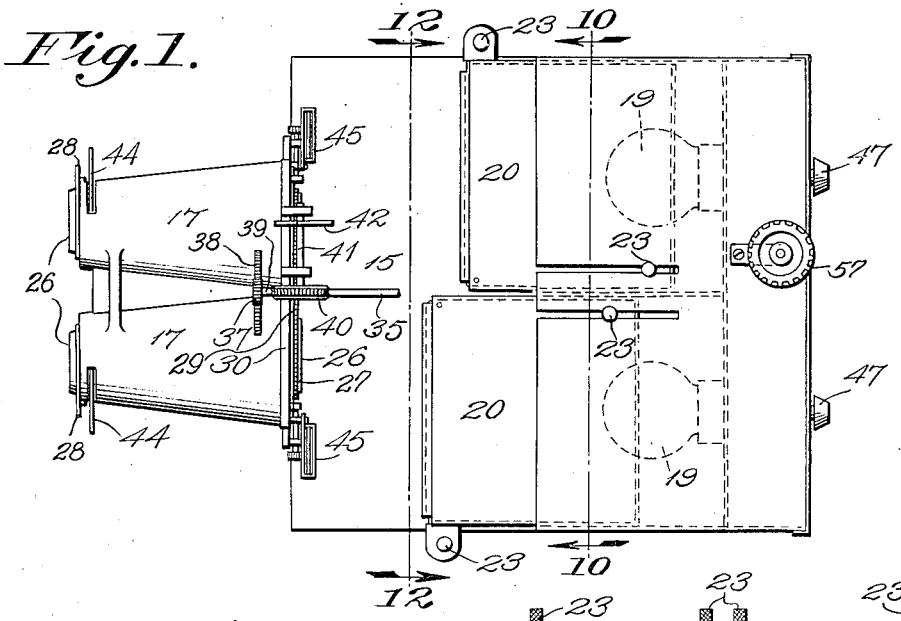
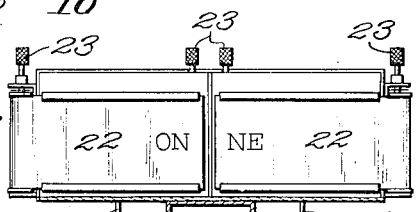
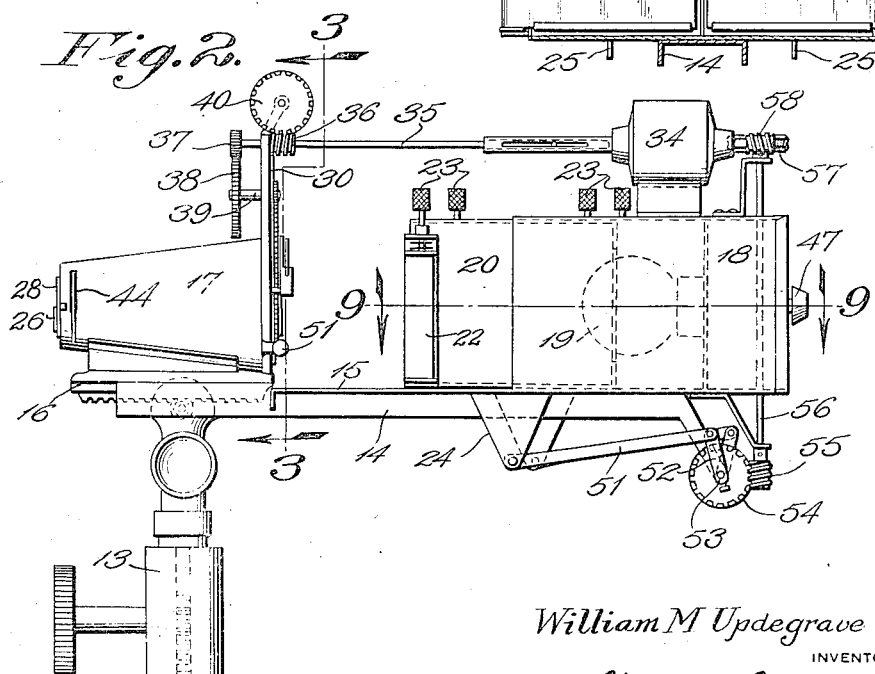
William M Updegrave
INVENTOR Aug. 10, 1937.  W. M. UPDEGRAVE  2,089,863
APPARATUS FOR TESTING AND EXERCISING THE EYES
Filed April 17, 1935  3 Sheets-Sheet 2
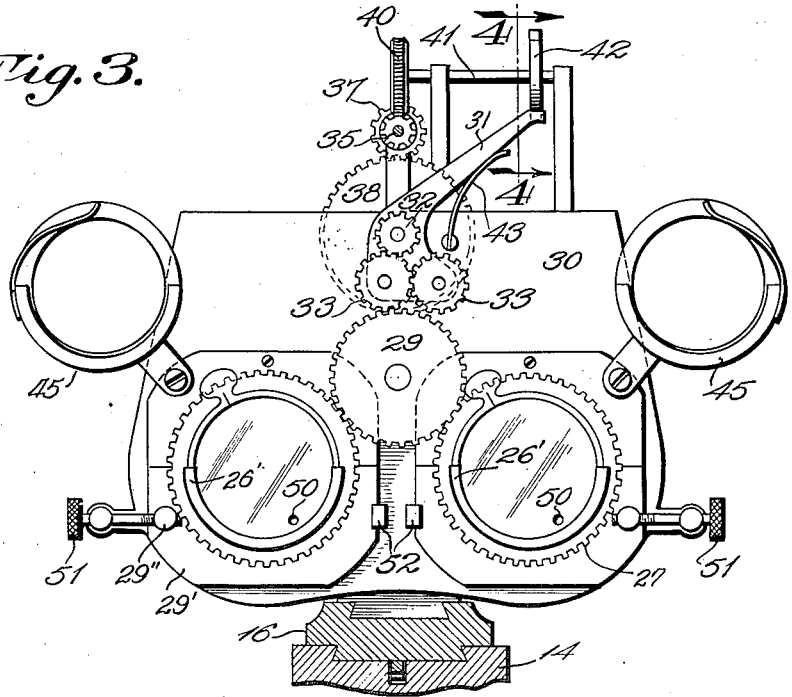
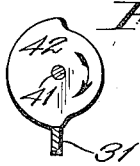
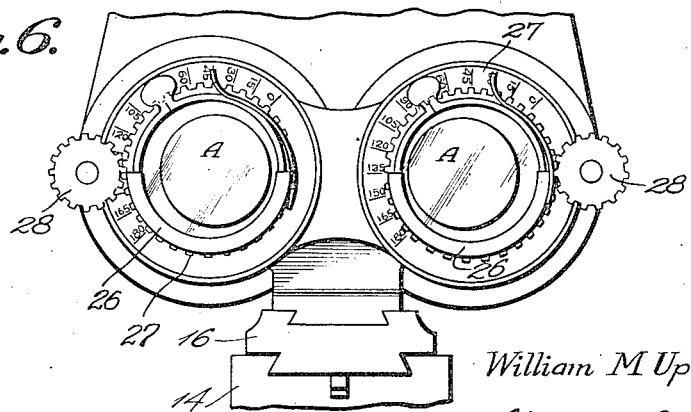
William M Updegrave
INVENTOR

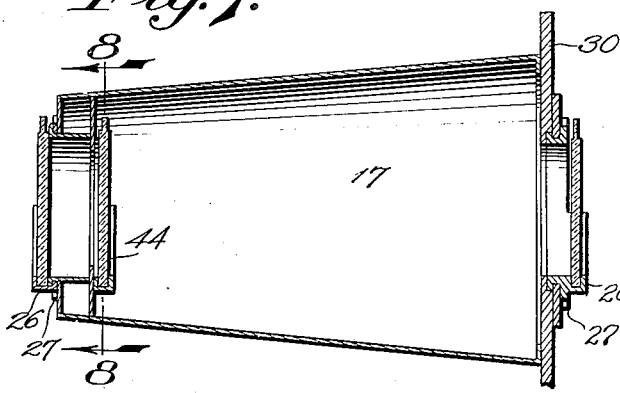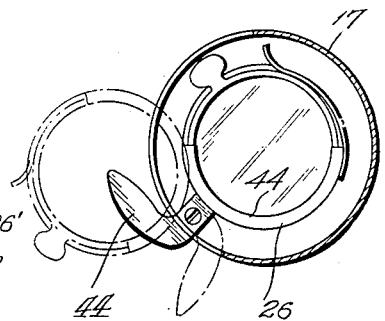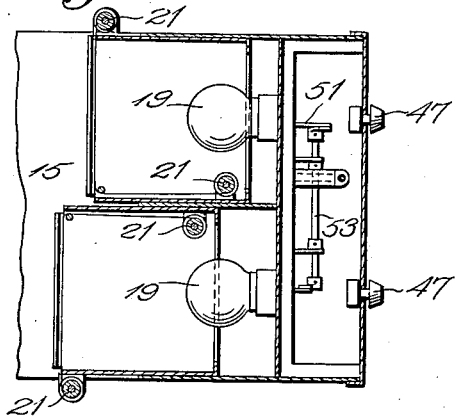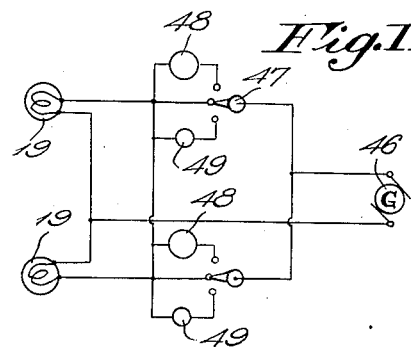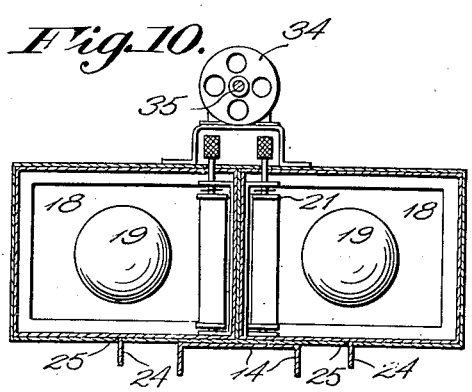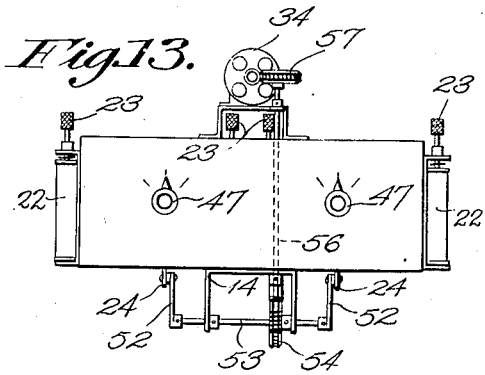

Patented Aug. 10, 1937

2,089,863

UNITED STATES PATENT OFFICE 2,089,863

APPARATUS FOR TESTING AND EXERCISING THE EYES

William M. Updegrave, Johnstown, Pa.

Application April 17, 1935, Serial No. 16,889

10 Claims. (Cl. 88—20)

In the present invention I further the objects contemplated in my previous United States Letters Patents, No. 1,811,034, granted June 23rd, 1931, and No. 1,818,660, granted August 11th, 1931, by employing a very simple mechanism capable of efficient and effective operation by anyone skilled in the art to which this invention relates, to test the eyes and exercise backward or inactive ocular muscles to remedy defects of the eyes without resort to glasses, or other artificial means now commonly employed.

In carrying out the present invention, I employ a stereoscope equipped with an illuminated background before which indicia bearing targets are positioned, each target being relatively adjustable with respect to the eye, for varying the magnitude of work to be performed by each eye, at the option of the operator.

Experiments have proven that most beneficial results are obtained, according to the teaching of the present invention, by the employment of transparent or translucent targets, one for each eye, which targets are laterally movable to fuse pictures, letters, or other indicia, when viewed through a stereoscope, not only for the purpose of diagnosing ocular deficiencies, but likewise to treat or massage ailing or inactive muscles.

It is further within the teaching of the present invention to provide an illuminated target for each eye, the illuminating agents periodically flashing on and off to correspondingly provide active and rest periods for the eyes during the time the targets are being viewed through the stereoscope, the indicia of the targets being invisible while the illuminating agent of each target is out.

Another object of the invention is to provide a stereoscope equipped with movable lens holders, adapted for the reception of different lenses for different errors of refraction and colored lenses from a standard test lens cabinet, the lenses being interchangeable while the illuminating agents, in the path of the stereoscope, are flashing, for varying the ocular exercise.

My present invention is constructed to encourage muscular development of the eyes by the use of complementally movable lenses, operable through an orbital path, each of the lenses having an eccentric focal point, preferably close to the lens periphery, for inducing and encouraging orbital movement of the eyes.

Other objects of the invention will be apparent from the following description of the present, preferred form thereof, taken in connection with the accompanying drawings, wherein Fig. 1 is a top plan view of the apparatus constructed in accordance with the present invention, showing one of the targets moved forwardly in advance of the other.

Fig. 2 is a side elevational view of the apparatus, a portion of the stereoscope adjusting means being fragmentarily shown.

Fig. 3 is a vertical sectional view, taken on the line 3—3 of Fig. 2, looking in the direction of the arrow and showing to advantage the mechanism employed for imparting rotation to the permanent lens holders, auxiliary lens holders being shown extending from the sides of the apparatus in an inoperative position.

Fig. 4 is a detail, fragmentary sectional view, taken on the line 4—4 of Fig. 3, looking in the direction of the arrows, showing one face of the cam employed for reversing the direction of rotation of the permanent lens holders.

Fig. 5 is a detail, enlarged, fragmentary view of one of the auxiliary lens holders.

Fig. 6 is a fragmentary front elevational view of the apparatus showing the outer permanent lens holders of the present invention mounted in the stereoscope tubes.

Fig. 7 is a longitudinal sectional view, taken through one of the stereoscope tubes, illustrating to advantage the manner of mounting the lenses therein.

Fig. 8 is a vertical sectional view, taken on the line 8—8 of Fig. 7, looking in the direction of the arrows, dotted lines being used to show one of the auxiliary lenses in an inoperative position.

Fig. 9 is a fragmentary, horizontal sectional view of the illuminating compartments and target carrying frames, taken on the line 9—9 of Fig. 2, looking in the direction of the arrows.

Fig. 10 is a transverse, sectional view of the apparatus, taken on line 10—10 of Fig. 1, looking in the direction of the arrows, showing portions of the illuminating compartments and portions of the target carrying frames.

Fig. 11 is a diagrammatic view of an electric circuit used in the present invention, including the source of energy, switches, flashers, and the film illuminating agents; and Fig. 12 is a detail, front elevational view of the film indicia bearing targets of the present invention, illustrating the manner of mounting the same on their frames.

Fig. 13 is a fragmentary rear elevation of the apparatus.

The present invention includes a stereoscope supporting standard 13, of conventional design, the top of which carries a supporting beam 14 with which a platform or table 15 is engaged. The beam 14 is provided at its forward end with a slot adapted for the reception of a complementally formed part carried by a stereoscope block 16, the latter being secured to the stereoscope tubes 17. It will be manifest from the drawings that the stereoscope is susceptible of multiple adjustment thereof in a manner well known in the art; hence, detailed description thereof is unnecessary, as it forms no part of the present invention.

A pair of light compartments 18 are formed on the platform 15, at the rear end of the latter, each of which compartments is provided with a lamp 19 of conventional design, screwed into a complemental socket in the rear wall of the compartment, the lamps being lighted in the usual manner by the house current. Each of the compartments is adapted for the reception of a movable target carrying frame or case 20, which in the present instance, is shown to be of rectangular configuration to complement the configuration of the compartment. The rear wall of each frame or case 20 is open to permit projection of the lamp bulb completely into the frame or case when the latter is nested completely within one of the compartments. Each frame or case is provided with a pair of manually operable film spools 21, upon which a target film 22 is adapted to be wound. One end of the film is secured to one of the spools and the opposite end secured to the other spool. The spools are each provided with a knurled finger grip 23 for the purpose of facilitating rotation of the spool during the winding or unwinding operation of the target in a manner hereinafter described. Each of the frames or cases 20 has a portion of its lower wall extended intermediate the sides thereof, to provide a finger engaging flange 24, which projects through a complemental slot 25 formed in the bottom of the light compartment. By use of the finger flanges, the target frames may be conveniently adjusted toward or away from the stereoscope tubes 17, to increase or diminish the work to be performed by the eye, at the option of the operator.

While the stereoscope of the present invention is of substantially standard design, considerable modification thereof is necessary to adapt the same for use in the present invention. I consequently mount permanently at the front of each tube a lens holder 26 while at the rear of each tube is a lens holder 26', said holders each having a peripheral row of teeth 27. The teeth of the front lens holders 26 are engaged by complemental cogs 28, these being hand turned for rotation while the teeth of both of the rear lens holders 26' are engaged by a common spur gear 29, which latter is rotatably mounted on a plate 30 at the rear of the tubes. The front lens holders are adapted for the reception of test lenses A and being equipped with the usual graduations. The lenses A are eccentrically disposed in said holders and on adjustment of the latter the setting of these lenses in conformity with the spaced relationship of the eyes of a person being tested may be had. The rear lens holders are adapted to be rotated when motion is imparted to the spur gear 29. For reasons hereinafter set forth, it is desired to alternately rotate the rear lens holders in a clockwise and counter-clockwise direction, and for this purpose, I mount on the plate 30 a bell crank lever 31, which has a power pinion 32 mounted on its axis, in addition to a pair of idler pinions 33, the latter being adapted for alternate engagement in mesh with the spur gear 29, the pinions 33 being enmesh with each other and one of these at all times meshing with the power pinion 32. Motion is imparted to the power pinion 32 through the medium of a motor 34, mounted on the top of the light compartments 18. The motor is in operative communication with said power pinion through a motor drive shaft 35, the outer end of which extends through the plate 30, being equipped on one side of the plate with a worm screw 36 and on the opposite side of the plate with a pinion 37. The pinion is engaged in mesh with a large gear wheel 38 mounted on the outer terminal of an axle 39, which extends through the plate 30, the gear wheel 38 being positioned in front of said plate and in spaced relation thereto, as is also the pinion 37. The axle 39 serves as the axis for the bell crank lever 31 and power pinion 32. The worm screw 36 meshes with a worm gear 40, the latter being mounted on one end of a shaft 41, which shaft is supported on the plate 30 and carries a cam 42. The free end of the bell crank lever 31 is adapted to wipe over the periphery of the cam 42 and is normally held in engagement with the latter by a spring 43. Consequently, when the power shaft 35 is rotated, motion is imparted to the power pinion 32, in a manner already described and to the spur gear 29 through one of the idler pinions 33 meshing with the latter. As soon as the cam has travelled through a semi-revolution on the shaft 41, the bell crank lever is moved on its axis so as to dis-enmesh one of the idlers 33 from the gear 29 and enmesh the other idler therewith. In this manner the direction of rotation of the rear lens holders 26 is changed with every half rotation of the cam 42. It is of course, to be understood that while I have shown a specific means for reversing the direction of rotation of the lens holders, this is only for purpose of illustration, as I am aware that various other mechanisms may be used for this purpose. The lenses fitting the rear lens holders 26' may be of a kind to encourage orbital movement of the eyes. The apparatus is useful as an eye tester and exerciser, it being necessary that it be adaptable for the fitting of all colors of lenses as well as different focusing lenses in view of the many different errors of refraction and these lenses are accommodated within the lens holders of the apparatus.

The power shaft 35 is adjustably mounted by making the same in two parts, one of which is tubular and receives a terminal of the opposite part, the parts being keyed together in any conventional manner. Consequently, the stereoscope may be moved relatively with respect to the light compartments without disconnecting or in any way adjusting the power shaft.

Each of the stereoscope tubes is provided with a pair of auxiliary lens holders, one of which, indicated on the drawings at 44, is mounted in a suitable slot in the front of the tube, and others designated 45, are mounted on the plate 30 for engagement over the rear of the tube. Preferably, the holder 44 is formed to accommodate a pair of lenses for use in special treatments or tests of the eye. As shown to advantage in Figs. 3 and 8, the auxiliary lens holders may be moved out of the path of vision of the tubes at the option of the operator.

For certain treatments of the eye muscles it is desirable to periodically flash the lights in the light compartments. For this purpose I mount conventional flashers in the electrical circuit. As shown diagrammatically in Fig. 11, the source of current is indicated at 46 and the circuit wires lead therefrom to switches 47 and the lamps 19. A long flasher 48 and short flasher 49 are mounted in the circuit and are selectively usable by operation of the switch 47. It is of course, manifest that each lamp may be continuously illuminated by connecting the switch directly with the lamp when it is in the position shown in Fig. 11. If desired, the switch may be moved to the long flasher or short flasher, at the option of the user, to correspondingly obtain a long or short flash, depending upon the treatment to be given the eye. In this manner the lamps are independently operable to correspondingly permit independent treatment of each eye. In addition, since the target carrying frames or cases are adjustable, the work of the eyes may be varied to increase or diminish the work imposed upon a particular eye. I prefer to use film targets as illustrated in the drawings in order that variation in the subject-matter of the targets may be had to permit more apt treatment and to permit a more accurate diagnosis of eye conditions. In Fig. 12 I have shown, for purposes of illustration, a target on each of the target frames or cases 20, wherein one of the targets carries the letters "O N" and the other target carries the letters "N E". When these targets are positioned in front of the illuminated background and properly adjusted to conform to the ocular condition of the patient looking through the stereoscope, the two letters "N" are fused to effect a single word "ONE". Not only do I employ letters on the targets, but in addition, numerals, animate and inanimate figures, and indicia of various miscellany are employed, in a manner to effect a fusion of the figures, indicia, etc., of the two film targets to diagnose eye conditions.

It has been found that exercise of the ocular muscles is most efficacious in the treatment of many deficiencies of the eyes, effecting permanent cures without the use of glasses or other artificial means; but it is necessary that the exercise be moderate and taken under proper conditions without injury to other parts of the eye. For this purpose I have shown in Fig. 3 of the drawings a pair of lenses mounted in the rear permanent lens holders, each of which is equipped with an eccentric opening 50 which on the turning of the holder carrying the same changes position in the path of vision to be depicted and followed by the eye of an observer for orbital exercising of the eyes. Preferably, as shown in the drawings, this opening is arranged in close proximity to the periphery of the lens. Consequently, as the lenses rotate, it encourages the eye looking through the stereoscope, to move through an orbital path. When this movement takes place for a predetermined period of time, the direction of rotation is automatically reversed by the mechanism already described, so as to reverse the orbital movement of the eyes.

For the treatment of certain eye conditions it becomes desirable to hold one of the rear lenses stationary while the other lens is being rotated. To accomplish this result, I have mounted each of the rear lens frames 26' on an auxiliary plate 29' which is swivelly engaged at 29" in any well-known manner, to the main plate 30. Each of the auxiliary plates may be moved by a set screw 51 carried by the plate 30 and connected with the auxiliary plate. It is, of course, understood that this movement is slight to effect a disengagement of the teeth of the frame 26 and the gear wheel 29. This movement is not sufficient to take the lens out of the path of vision of its tube 17. To reengage the teeth it is only necessary that the set screw 51 be rotated in the opposite direction until contact is made with the abutment lip 52, the latter being carried by the plate 30 as shown to advantage in Fig. 3 of the drawings.

It is to be understood that each of the targets 22 may be translucent and equipped with indicia on both sides as well as on one side as shown in Fig. 12 of the drawings. Where the indicia appears on both sides of the target the picture viewed through the stereoscope tube is not complete until the light in the compartment flashes to thereby render the indicia on the reverse side legible.

For the automatic adjustment of the target frames the finger engaging flanges 24 have pivotally connected thereto throw links 51, these being also pivoted to crank arms 52 fixed to a shaft 53 the latter carrying a worm gear 54 meshing with a worm screw 55 on a driven shaft 56. The shaft 56 carries a worm gear 57 meshing with a worm screw 58 on the power shaft 35 of the motor 34 so that power therefrom can be utilized for the adjustment of said frames.

On detaching the links 51 from the flanges 24, the latter can be manually manipulated for adjustment of the target frames as will be apparent.

The lens holders of the present invention are adapted for the reception of lenses from a standard test lens cabinet generally employed by eyesight specialists and optometrists and different colored lenses are adapted to be used to vary the exercise of the eyes while the lamps 19 are flashing.

It is to be understood that various changes may be made in my invention, especially in the construction, proportion and arrangement of parts, within the scope of the appended claims.

What is claimed is:

1. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, and driving means operating one of said pinions.

2. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, and changeable target means rearwardly of and aligned with the path of vision through said tubes.

3. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, and a cam operated by said driving means and active upon the bell crank lever for operating the same to alternately change the engagement of the pinions with the spur gear.

4. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, and spring means active upon the bell crank lever for holding the same in position for positive engagement of one of the pinions with the spur gear.

5. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, spring means active upon the bell crank lever for holding the same in position for positive engagement of one of the pinions with the spur gear, and selective illuminating means for the target means.

6. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, spring means active upon the bell crank lever for holding the same in position for positive engagement of one of the pinions with the spur gear, selective illuminating means for the target means, and enclosures for the illuminating means.

7. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, spring means active upon the bell crank lever for holding the same in position for positive engagement of one of the pinions with the spur gear, selective illuminating means for the target means, enclosures for the illuminating means, and means for adjusting the target means with relation to the enclosures and said tubes.

8. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, spring means active upon the bell crank lever for holding the same in position for positive engagement of one of the pinions with the spur gear, selective illuminating means for the target means, enclosures for the illuminating means, means for adjusting the target means with relation to the enclosures and said tubes, and means for flashing the illuminating means.

9. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, spring means active upon the bell crank lever for holding the same in position for positive engagement of one of the pinions with the spur gear, selective illuminating means for the target means, enclosures for the illuminating means, means for adjusting the target means with relation to the enclosures and said tubes, means for flashing the illuminating means, and driven connections between the driving means and said target adjusting means.

10. In a device of the character described, a stereoscope including a pair of tubes arranged side by side, turnable lens holders arranged at the front and rear of each tube in the line of vision therethrough, a spur gear common to both of the rear lens holders, a support for the spur gear, a bell crank lever swingingly connected by said support, enmesh pinions rotatably supported by said lever for alternate engagement with the spur gear, driving means operating one of said pinions, changeable target means rearwardly of and aligned with the path of vision through said tubes, a cam operated by said driving means and active upon the bell crank lever for operating the same to alternately change the engagement of the pinions with the spur gear, spring means active upon the bell crank lever for holding the same in position for positive engagement of one of the pinions with the spur gear, selective illuminating means for the target means, enclosures for the illuminating means, means for adjusting the target means with relation to the enclosures and said tubes, means for flashing the illuminating means, driven connections between the driving means and said target adjusting means, and manually operated means for independently turning each front lens holder.

WILLIAM M. UPDEGRAVE.